May 3, 1966

R. L. RIPLEY 3,249,090

ANIMAL FEEDER

Filed March 8, 1965

INVENTOR.
ROBERT L. RIPLEY,
BY
Berman, Davidson & Berman
ATTORNEYS.

May 3, 1966  R. L. RIPLEY  3,249,090
ANIMAL FEEDER
Filed March 8, 1965  2 Sheets-Sheet 2
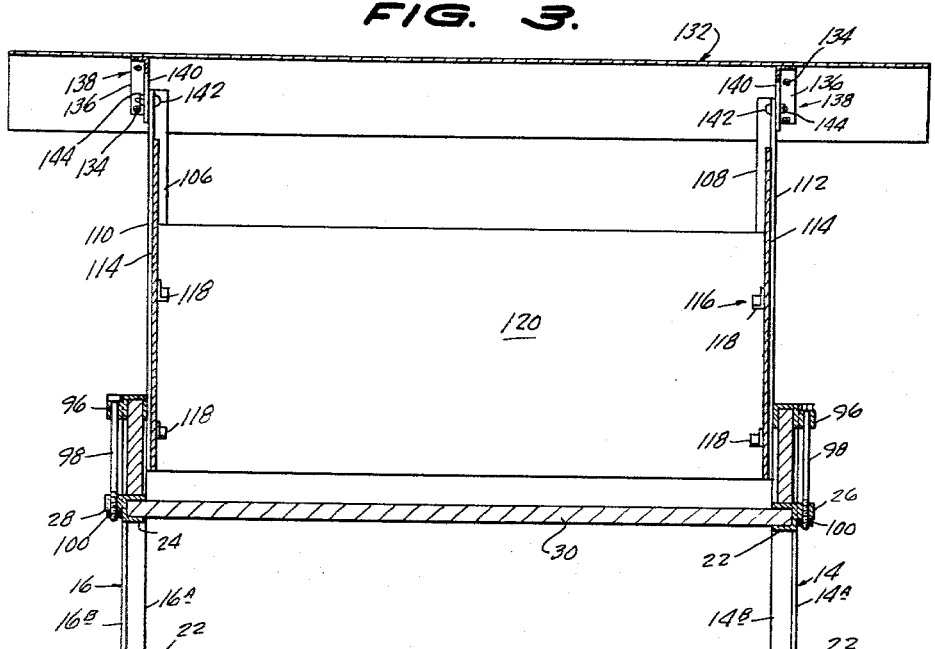
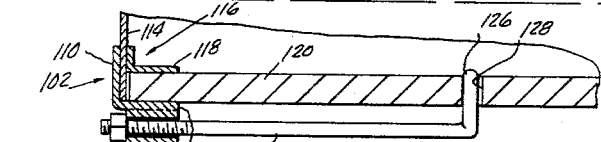
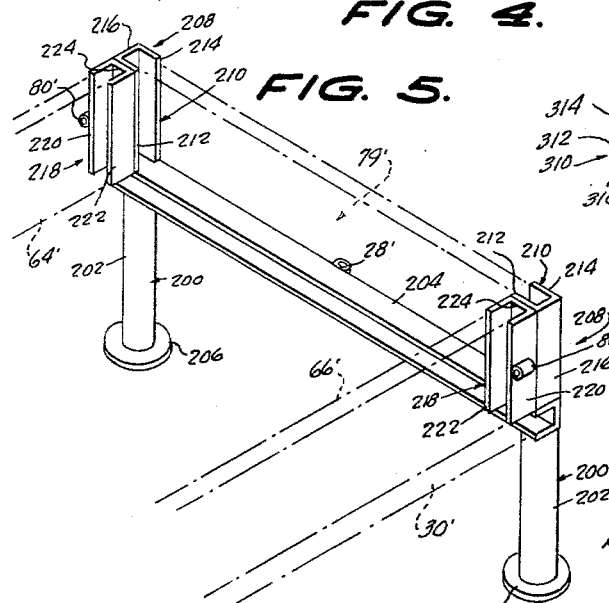
INVENTOR.
ROBERT L. RIPLEY,
BY
Berman, Davidson & Berman
ATTORNEYS.

United States Patent Office 3,249,090
Patented May 3, 1966

3,249,090
ANIMAL FEEDER
Robert L. Ripley, Glencoe, Okla.
Filed Mar. 8, 1965, Ser. No. 437,941
7 Claims. (Cl. 119—52)

This invention relates to the general field of animal feeding devices and, more specifically, to feeders for feeding hay and other foods to cattle, the feeder involving the provision of a substantially hollow rectangular feed box to which is connected a substantially V-shaped feed-retaining hopper adapted to feed food to the feed box in accordance with cattle demands.

One of the primary objects of this invention is to provide an animal feeder wherein means are provided for protecting animal feed in the hopper or feed box from the elements to prevent spoilage thereof.

Another object of this invention is to provide an animal feeder which may be retailed in kit form, the assembly thereof requiring the use of but a few primary tools or, optionally, the feeder may be sold in pre-assembled form by the dealer or in a "knock-down" condition.

It is a still further object of this invention to provide an animal feeder of the type generally described above, wherein the component elements thereof are in the form of subassemblies which may be readily assembled or disassembled for easy transport from one site to another, and to minimize the amount of space required for storing the same when the feeder is not in use.

Another object of this invention is to provide a portable animal feeder with a detachable roof which is interchangeable, end-for-end, and which extends laterally on both sides of the feeding device in order to completely cover the hopper and feed box to protect the food contained therein from the elements.

It is a still further object of this invention to provide an animal feeder designed for the special use of cattle and wherein certain component elements thereof may be interchangeable, at will.

This invention contemplates, as a still further object thereof, the provision of an animal feeder such as that generally described above, the feeder being non-complex in construction and assembly, inexpensive to manufacture and maintain, and a feeder which is durable in use.

Other and further objects and advantages of this invention will become more evident from a consideration of the following specification when read in conjunction with the annexed drawings, in which:

FIGURE 3 is a longitudinal medial cross-sectional view, FIGURE 3 being taken substantially on the vertical plane of line 3—3 of FIGURE 2, looking in the direction of the arrows;

FIGURE 4 is an enlarged fragmentary detail cross-sectional view of certain locking means employed in the construction of the hopper of the feeder;

Figure 1:
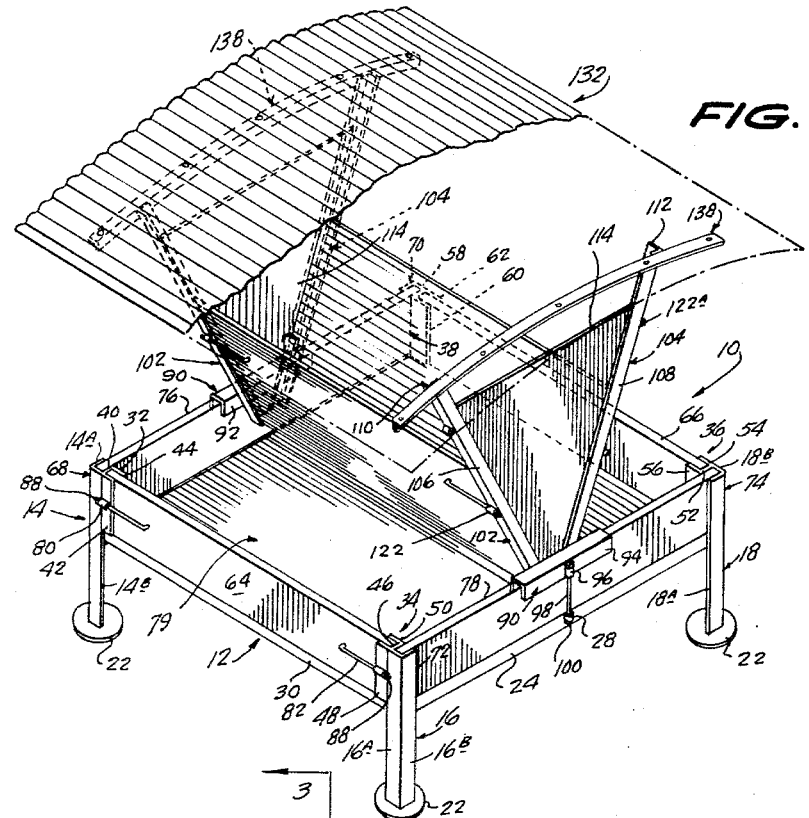
FIGURE 1 is a perspective view of an animal feeding device constructed in accordance with the teachings of one embodiment of this invention.

FIGURE 5 illustrates a second modification of the feeder box assembly means; and FIGURE 6 is a fragmentary perspective view partly broken away to illustrate another embodiment of the corner construction of the feed box; and FIGURE 7 is an enlarged fragmentary detail cross-sectional view, FIGURE 7 being taken substantially on the horizontal plane of line 7—7 of FIGURE 6, looking in the direction of the arrows.

Referring now more specifically to FIGURES 1 to 4, inclusive, of the drawings, reference numeral 10 designates, in general, a cattle feeder, and the like, constructed in accordance with the teachings of one embodiment of this invention. As shown therein, the feeder 10 comprises an elongated substantially rectangular base frame 12 which includes four normally upright angle iron corner support standards 14, 16, 18 and 20. Each of the standards, at their respective lower ends, is rigidly secured to an enlarged, normally horizontal, ground-engaging discoidal member 22. Each standard 14, 16, 18 and 20 is provided with arms 14A, 14B, 16A, 16B, 18A, 18B, and 20A, 20B, respectively.

Fixedly secured to and extending between the arms 14A, 14B and 20A, 20B, respectively, intermediate their respective upper and lower ends is a pair of substantially U-shaped channel members 22, 24 extending parallel to one another and which open inwardly toward each other, the channel members 22, 24 being disposed in longitudinally-spaced and confronting relation relative to each other. Each of the channel members 22, 24 is provided, respectively, with laterally and outwardly-projecting hollow bosses 26, 28 to which further reference will be made below. Reference numeral 30 indicates an elongated substantially rectangular bottom wall, the opposed ends of which are releasably secured within the channel members 22, 24.

Reference numerals 32, 34, 36 and 38 denote substantially upright U-shaped channel members of which the channel member 32 is formed with a bight 40 secured to the arm 14B and includes the outer and inner arms 42, 44. The channel member 34 has a bight 46 and outer and inner arms 48, 50, and as is seen in the drawings, the channel members 32, 34 are parallel to one another and open toward one another.

The channel member 36 is formed with a bight 52 and outer and inner arms 54, 56, respectively, and has its bight fixedly secured to the arm 18B. The channel member 38 is formed with a bight 58 which is secured to the arm 20A, and from the bight 58 laterally project the arms 60, 62. As is seen in FIGURE 1, the channel members 36, 38 are parallel with respect to one another and open toward one another.

The lower ends of the channel members 32, 34, 36 and 38 are seated substantially flush against the bottom wall 30 and the pairs of channel members 32, 34 and 36, 38 receive therein, respectively, the elongated substantially rectangular sidewalls 64 and 66. The arms 14A, 14B adjacent their upper ends taken together with the bight 40 cooperate to form a U-shaped channel member 68 which is parallel to and which opens toward a confronting channel 70 formed by the upper ends of the arms 20A, 20B and the bight 58. In a similar manner, the upper ends of the arms 16A, 16B and the adjacent bight 46 cooperate to define a substantially U-shaped channel member 72 which is parallel to and which opens toward a U-shaped channel member 74 that comprises the upper ends of the arms 18A, 18B and the adjacent bight 52. The channel members 68 and 70 receive therein the opposed ends of an elongated substantially rectangular upright end wall 76, and the opposed channel members 72, 74 receive therein the opposed ends of a second elongated substantially rectangular upright end wall 78. The bottom wall 30, sidewalls 64, 66, and end walls 76, 78 taken together define an elongated substantially hollow rectangular feed box 79 (see FIGURE 1).

Reference numerals 80 each designate a normally horizontally-extending hollow barrel each, respectively, being secured to the arms 42, 48, 54 and 62. Each barrel 80 has inserted therethrough the threaded end of a shank 82 which, at its other end, terminates in an offset hook 84 that is adapted to be received within an opening 86 which extends, respectively, transversely through each sidewall 64, 66, adjacent each end thereof. A take-up nut 88 is mounted on the threaded end of each shank 82, and this hardware prevents, of course, the longitudinal shifting of the pairs of standards 14, 16 and 18, 20 away from one another and maintains the sidewalls within their respective channel members.

Reference numerals 90 indicate a pair of identically constructed inverted substantially U-shaped brackets having, respectively, inner and outer sidewalls 92, 94. As is seen in FIGURES 1 and 3, the brackets are supported on the upper edges of the end walls 76, 78 intermediate their respective ends, and the sidewalls 94 thereof are each provided with a laterally-projecting substantially hollow boss 96 adapted for alignment with the bosses 26, 28. The aligned bosses 26, 96 and 28, 96 receive therethrough elongated bolts 98 which are secured therein by nuts 100. This construction effectively prevents the longitudinal shifting of the brackets 90 on the upper edge of the end walls 76, 78 and also the separation of the brackets 90 from their respective end walls.

Figure 2:
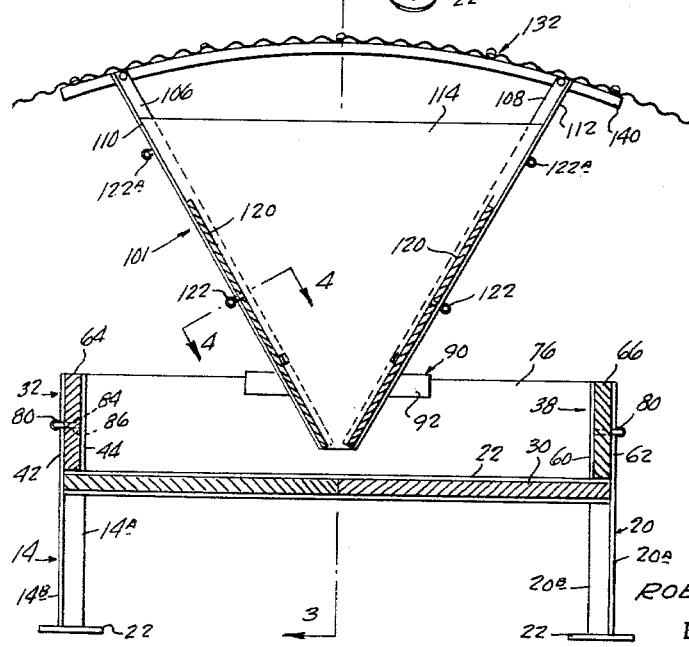
FIGURE 2 is a transverse cross-sectional view of the feeding device shown in FIGURE 1.

Reference numeral 101 indicates, in general, a substantially V-shaped hopper wherein reference numerals 102, 104 indicate a pair of L-shaped hopper supports, there being such a pair for each of the brackets 90. As is seen in FIGURES 1 and 2, the supports 102, 104 converge downwardly toward their respective brackets 90 and portions thereof extend above and below their associated brackets 90. The arms 106, 108 of the supports 102, 104 fit flush against the sidewalls 92 to which they are rigidly secured as by welding (not shown). The other arms 110, 112 of the supports 102, 104 are disposed in confronting, downwardly-converging relationship relative to one another, and as is seen in the drawings, an inverted substantially V-shaped sheet of metal 114 comprising an end wall is fixedly secured to each pair of supports 102, 104 between their respective arms. As is seen in FIGURES 1 and 2, each sheet 114 extends substantially to the apex of the supports 102, 104 but terminate short of the upper or base end thereof to provide ample space for the replenishing of feed and for passage of air.

Fixedly secured to each end wall 114 are a plurality of L-shaped abutments or stops 116 which include arms 118 disposed in spaced and parallel relation relative to the arms 106, 108, the abutments or stops 116 serving a function to be described.

Supported between and on each pair of supports 102, 102 and 104, 104 and between the end walls 114 are a pair of identically constructed horizontally-elongated substantially rectangular lower hopper sidewalls 120, the sidewalls being disposed between the arms 118 and the adjacent arms 106, 108 at each side of the device 10. Hardware and locking means of the type previously described are employed to hold these hopper walls 120 in their respective positions. These means comprise an elongated barrel 122 having a normally horizontal axis, the barrels 122 being fixedly secured to the arms 110, 112 intermediate their respective ends, and similar barrels 122A may be affixed thereto adjacent to but spaced below the upper ends of the supports 102, 104, these last-mentioned barrels 122 or 122A serving a function to be described.

As before, the barrels 122 or 122A may have inserted therethrough the threaded end of a shank 124 (see FIGURE 4) which, at its other end, terminates in an offset hook 216 which is adapted to be received within an opening 128 extending transversely through each of the hopper walls 120 adjacent each end thereof. A take-up nut 130 is mounted on each threaded end of each shank 124, thereby insuring a releasable connection between the pairs of supports 102, 102 and 104, 104 with the hopperwalls 120 at each side of the cattle feeder or device 10.

Reference numeral 132 denotes a roof or cover member for the feeder 10. The roof 132 is preferably formed of a corrugated sheet of metallic material having an elongated generally rectangular configuration, but which is arcuately-shaped about its longitudinal axis. To the underside of the roof or cover member 132 adjacent each end thereof is secured, as by screws 134, the arm 136 (see FIGURE 3) of an arcuate L-shaped bracket 138, the other arm 140 of which is releasably secured to the upper ends of the arms 106, 108 at each end of the hopper feed means 101 as through the use of the bolts and nuts 142, 144.

From the foregoing description it is readily ascertained that food for the cattle may be easily introduced into the hopper 101 between either of the sidewalls 120 and the roof or cover member 132. The feed descends by gravity into the box 79 in accordance with cattle needs, the lower ends of each of the sidewalls 120 being supported, of course, above the bottom wall 30. Optionally, and not shown in the drawings, auxiliary sidewalls may be introduced between the upper ends of the sidewalls 120 and the roof or cover member 132 to protect the feed from adverse weather conditions, the auxiliary sidewalls being secured in place by hardware of the type heretofore described.

With the cattle-feeding device 10 constructed in accordance with the manner described above, it now becomes obvious that the abutments or stops 116 are utilized to prevent the sidewalls 120 from being pushed or "nosed" in as the cattle feeds which would close the apex end of the hopper and prevent discharge of feed therefrom.

As has been stated above, the cattle feeder 10 described herein is designed to be sold in kit form or pre-assembled as desired, it being only necessary that welding equipment be available to connect the standards 14, 16, 18 and 20 with the channel members 32, 34, 36 and 38, as well as to effect connection of the channel members 22, 24 with their respective standards 14, 20 and 16, 18.

The end construction involving the pairs of standards 14, 20 and 16, 18 together with their respective channel members could be pre-assembled along with the hardware 80, 82, 84, if desired, without destroying a kit-type retail, leaving it only necessary for the purchaser to have available a pair of pliers in order to assemble the feed trough. Under such circumstances, the supplier need only have available lengths of material to make up the bottom wall 30, the sidewalls 64, 66 and end walls 76, 78 that would then be cut to conform to the specification of the purchaser.

The supports 102, 104 may be, if desired, fixedly secured to the channel members 90 and sold with the kit, together with the end walls 114, and this structure, it is seen, is interchangeable. The roof or cover member 132 may be optionally included with the kit.

From the foregoing description it is also clear that the feeder device 10 after assembly, may be broken down into component basic sub-assemblies such as, for example, the standards 14, 20 as connected by the channel member 22, the standards 16, 18 as connected by the channel member 24; the end sections including the angle irons 102, 104 and their connected end walls 114 together with the L-shaped bracket 138; and, of course, the integral roof 132 which may be turned end-for-end, as desired. All of these features permit the feeder device 10 to be easily assembled and disassembled and when not needed for use by cattle, the device 10 may be easily stored in but a minimum of space.

In FIGURE 5 is illustrated a second embodiment of this invention which is directed solely to a change in the feed box construction and, more specifically, the modification is directed to the construction of the standards for supporting the same. In all other respects, the invention of the modification is identical to the invention described in detail above.

In this second embodiment of the invention the end standards are designated by reference numeral 200, there being a pair thereof at each end of the feed box. The standards 200 are of identical construction and include lengths of normally upright hollow cylindrical pipe or tubing 202 to the upper ends of which are welded or otherwise secured to the opposed ends of an inwardly-opening substantially U-shaped channel member 204. The lower ends of each standard terminate in a ground-engaging discoidal member 206.

Reference numerals 208 each designates a sub-assembly preferably, though not necessarily, preformed. Each sub-assembly 208 includes a normally upright substantially U-shaped channel member 210 each having inwardly and outwardly-facing arms 212, 214, respectively, connected together by a bight 216. Each sub-assembly 208 also includes a second upright substantially U-shaped channel member 218 having arms 220, 222 connected by a bight 224. As is seen in FIGURE 5, each bight 224 is rigidly secured to the immediately adjacent arm 212 with the two arms 222 facing inwardly toward one another.

Fixedly secured to the channel members 204 and 218 are bosses 28' and barrels 80' of the type previously described. The lower ends of each of the channel members 210 are rigidly secured (as by welding), respectively, to the opposed ends of the channel members 204. The inwardly-opening channel members 210 receive, of course, the end wall 76' (or 78'), the U-shaped channel members 218 at the opposed ends of the feed box 79' receive the opposed ends of the sidewalls 64', 66', and the inwardly-opening confronting channel members 204 receive the opposed ends of a bottom wall 30'.

In FIGURES 6 and 7 another feed box construction is shown. In this embodiment, the feed box is generally designated by reference numeral 300 and includes, as before, the normally upright angle iron corner support standards 302 which comprise the integrally-connected substantially rectangular arms 304, 306 which terminate, at their respective lower ends, in fixedly connected substantially rectangular ground-engaging plates 308. As in the first embodiment of this invention described above, the pair of standards 302 at each end of the feed box 300 have fixedly secured thereto, intermediate their respective ends, inwardly-confronting substantially U-shaped channel members 310 each having a bight 312 extending between and being integral with a pair of laterally-extending vertically-spaced and substantially parallel arms 314, 316. The opposed channel members 310 receive and support therebetween an elongated substantially rectangular bottom wall 318, as before.

Supported on each of the upper arms 314 is an elongated upright end wall 320 which extends between and engages the arms 304, 306 at each end of the feed box 300. Supported on the opposed longitudinally-extending marginal edges of the bottom wall 318 at the opposed sides thereof are elongated substantially rectangular upright sidewalls 322. The sidewalls 322, at their respective ends, engage the opposed arms 306 and abut the adjacent ends of the sidewalls 320.

The sidewalls 322, adjacent each end thereof, are transversely bored as at 324 (see FIGURE 7) and the end walls 320 are similarly bored at 326 adjacent their respective ends. As is seen in FIGURES 6 and 7, the axes of the bores 324, 326 are perpendicular to one another, and the outer ends of the bores 326 confront transversely-extending openings 328 formed in the arms 304.

The bores 324 receive the legs 330 of J-shaped bolts 332 having shanks 333 that extend through the bores 326 and the openings 328, the outer ends of the shanks 333 being tapped as at 334 to receive thereon the washers 336 and lock nuts 338. Thus, and through these connector members, the component structural elements of the feed box may be tightened to a rigid assembly. While the hopper means and other elements of the invention shown in FIGURE 1, for example, are not shown in FIGURES 6 and 7, it will be understood that the same may be applied to this embodiment of the invention in the same manner as described above.

Having described and illustrated several embodiments of this invention in detail, it will be understood that the same are offered merely by way of example, and that this invention is to be limited only by the scope of the appended claims.

What is claimed is:

1. An animal-feeding device comprising an elongated substantially hollow rectangular feed box having an open upper end, a standard at each corner of said feed box supporting the latter above the ground, a first elongated substantially U-shaped channel member being fixedly secured at its opposed ends to, respectively, each pair of standards at each end of said feed box and intermediate the upper and lower ends of said standards, said first U-shaped channel members opening toward each other, an elongated substantially rectangular bottom wall for said feed box having its opposed ends disposed within said channel members and extending therebetween, said standards terminating at their respective upper ends in a pair of second U-shaped channel members disposed at right angles relative to one another, said standards at each end of said feed box having a first pair of said last-named channels confronting one another to receive an end wall therein, said standards at the opposed sides of said feed box having second pairs of said last-named channel members confronting one another, an elongated substantially rectangular sidewall for each of said second pairs of channel members, said sidewalls having their respective ends disposed within their respective second pairs of channel members, means releasably connecting the opposed ends of said sidewalls with their immediately adjacent channel member, and a substantially V-shaped hopper having the apex end thereof disposed below and in open communication with the open end of said feed box and in vertically-spaced relation relative to said bottom wall, and means supporting said hopper on said sidewalls.

2. An animal-feeding device as defined in claim 1, wherein said last-named support means includes an inverted substantially U-shaped channel member mounted, respectively, over the upper edges of each of said end walls, a pair of downwardly-converging hopper wall supports for each of said inverted U-shaped channel members and having portions thereof extending above and below said inverted U-shaped channel members, an elongated substantially rectangular sidewall extending between each pair of supports on each side of said feeder box, means releasably connecting the opposed ends of said last-named sidewalls with its immediately adjacent support, and an inverted substantially triangular end wall extending between and fixedly secured to each adjacent pair of supports.

3. An animal-feeding device as defined in claim 2, and means extending between said first U-shaped channel members and said inverted U-shaped channel members releasably connecting the inverted U-shaped channel members with their respective associated end wall.

4. An animal-feeding device as defined in claim 3, and an arcuately-shaped bracket releasably secured to the upper ends of each adjacent pair of said supports, and an elongated substantially rectangular cover member arcuately-shaped in transverse cross-section longitudinal axis releasably secured to said brackets.

5. An animal-feeding device comprising an elongated substantially rectangular feed box having an open upper end, a standard at each corner of said feed box supporting the latter above the ground, a first elongated substantially U-shaped channel member being fixedly-secured at its opposed ends to, respectively, each pair of standards at each end of said feed box and intermediate the upper and lower ends of said standards, said U-shaped channel members opening toward each other, an elongated substantially rectangular bottom wall having its opposed ends disposed in said channel members, said standards adjacent their respective upper ends terminating in a pair of angle members each of which opens toward an immediately adjacent angle member, said angle members each receiving therein one pair of adjacent ends of elongated substantially rectangular side and end walls, J-shaped hook means releasably-connecting the opposed ends of said end walls with their immediately adjacent angle member, a substantially V-shaped hopper having downwardly-inclined sidewalls and an open apex end thereof disposed below said side and end walls of said feed box and in open communication with said open upper end of said feed box in vertically-spaced relation relative to said bottom wall, triangular end walls closing adjacent pairs of ends of said hopper, and support means for said hopper, said support means including an inverted substantially U-shaped bracket mounted over the upper end of each end wall of said feeder box, a pair of downwardly-converging L-shaped support members for each inverted U-shaped bracket, means fixedly-securing said L-shaped support members adjacent their respective lower ends to their associated inverted U-shaped bracket, and J-shaped hook means fixedly-connecting each end of said sidewalls with each adjacent one of said support members.

6. An animal-feeding device as defined in claim 5, wherein said J-shaped hook means includes an elongated shank and an offset foot portion, said shank portion of each J-shaped hook means having an outer end portion releasably-connected to an immediately adjacent angle member and the foot portion thereof releasably-secured to the immediately adjacent one of said sidewalls of said feed box.

7. An animal-feeding device as defined in claim 6, wherein each adjacent pair of side and end walls of said feed box are provided with transversely-extending bores at each adjacent pair of ends thereof, said shank portion of each hook extending through, respectively, one of said bores formed in one of said end walls with its said foot portion extending into the bore of the adjacent one of said sidewalls.

References Cited by the Examiner
UNITED STATES PATENTS

| 1,615,402 | 1/1927 | Pratt | 119—52 |
| 3,082,739 | 3/1963 | Schloemer | 119—61 |

FOREIGN PATENTS

| 104,736 | 8/1938 | Australia. |

SAMUEL KOREN, *Primary Examiner.*

HUGH R. CHAMBLEE, *Examiner.*